United States Patent [19]
Byrd

[11] 3,720,266
[45] March 13, 1973

[54] METHOD OF DEEP WELL CEMENTING

[75] Inventor: Ottis G. Byrd, Jackson, Miss.

[73] Assignee: Cities Service Oil Company, Tulsa, Okla.

[22] Filed: April 7, 1971

[21] Appl. No.: 131,962

[52] U.S. Cl. ................................................166/312
[51] Int. Cl. ...........................................E21b 37/00
[58] Field of Search..............166/312, 311, 291, 285; 175/65, 70

[56] References Cited

UNITED STATES PATENTS

| | | | |
|---|---|---|---|
| 3,411,580 | 11/1968 | McKinney | 166/312 X |
| 3,022,823 | 2/1962 | Caldwell | 166/312 X |
| 2,836,246 | 5/1958 | Hoch | 166/312 X |

*Primary Examiner*—Robert L. Wolfe
*Attorney*—J. Richard Geaman

[57] ABSTRACT

A method utilizing a sequential injection of ever-decreasing weight drilling muds into wells for the total displacement of high density drilling mud from the wellbore. Wellbore cementing is accomplished through the introduction of a wellbore cement having substantially the same weight as the drilling mud remaining within the wellbore after displacement of the high density drilling mud. The cement introduced easily displaces the drilling mud present in the well so that adequate contacting of the casing, cement and wellbore walls is achieved with no residual high density drilling mud remaining within the casing completion.

7 Claims, 1 Drawing Figure

PATENTED MAR 13 1973
3,720,266
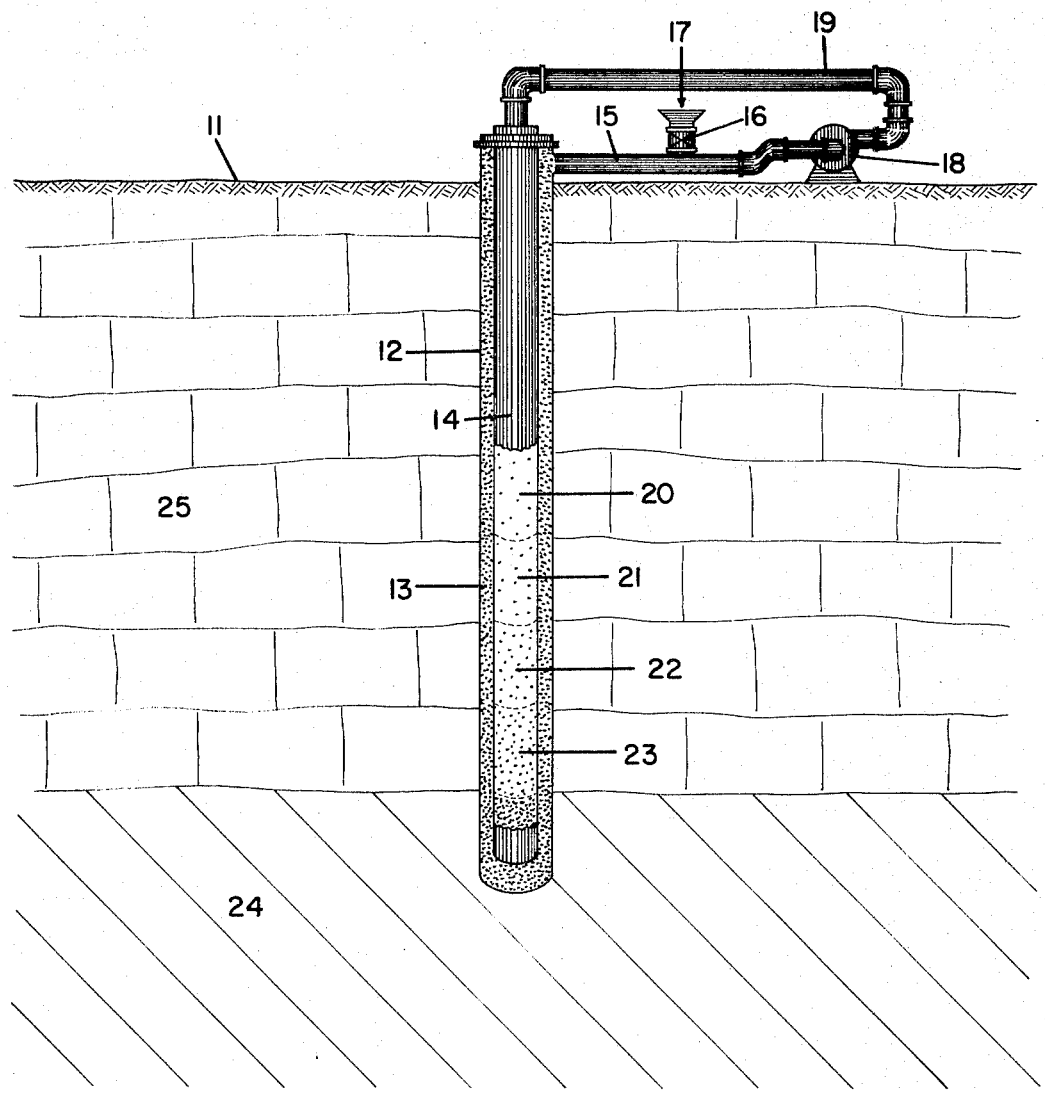
OTTIS G. BYRD,
INVENTOR.
BY J Richard Ceaman
ATTORNEY.

3,720,266

METHOD OF DEEP WELL CEMENTING

BACKGROUND OF THE INVENTION

The present invention relates to a method of deep well cementing. More particularly, the method of the present invention involves the introduction of decreasing weight drilling muds into wells for the displacement of a high density drilling mud from the well for the subsequent cementing of casing.

In conventional cementing of deep wells, a particular problem is incurred wherein drilling muds exhibiting an exceptionally high weight are utilized in order to control high pressure gas deposits contained within the formations encountered by the drilling bit. The problem develops when cement is introduced or squeezed into these wells in an attempt to displace the high density drilling mud contained therein. Normally, the cement tends to channel or viscous fingering occurs with the cement channeling through the high density drilling mud contained within the wellbore such that inadequate contacting of cement with wellbore walls occurs. Pockets of high density drilling mud are retained within the wellbore as a detrimental residual characteristic of the cementing job. Therefore, in conventional procedures of cementing wellbores, having the presence of high density drilling muds, there must be performed a continuous operation of circulating cement therein the wellbore in order to insure that a clean wellbore is associated with the cement introduced so that, subsequent to the washing operation, no pockets of high density drilling mud remain within the casing completion. Should high density drilling muds remain and detrimental cementing of casing occur, inadequate contacting of the casing cement with the wellbore results.

What is required is a method for removing high density drilling muds from drilled wellbores so that the cementing of a casing string therein may be accomplished with adequate contacting of the casing, cement and wellbore walls being provided.

It is an object of the present invention to provide a method for the cementing of deep wells containing high density drilling muds.

It is a further object of the present invention to provide a method for sequentially introducing drilling muds into deep wells for the removal of high density drilling muds utilized in the drilling of the well for the subsequent cementing of casing in the well.

It is still a further object of the present invention to provide a method for the sequential injection of ever-decreasing weight drilling muds into wells for the total displacement of high density drilling mud wherein the displacement drilling muds subsequently introduced therein exhibit miscibility with the cement utilized for the subsequent cementing of a casing string in the wellbore.

With these and other objects in mind, the present invention may be more fully understood by referral to the accompanying FIGURE and following description.

SUMMARY OF THE INVENTION

The objects of the present invention may be accomplished through the use of a method of removing high density drilling mud from a wellbore for the subsequent cementing of casing. The method comprises injecting an ever-decreasing weight drilling mud into the wellbore with the first portion of the ever-decreasing weight drilling mud injected having a density substantially that of the high density drilling mud contained within the wellbore and with the last portion thereof having a density similar to that of the cement to be utilized. In the method, the density of the ever-decreasing weight drilling mud is varied by altering the particulate content of the ever-decreasing weight drilling mud introduced into the wellbore. Generally, the high density drilling mud and the ever-decreasing weight drilling mud have the same drilling mud base. A preferred drilling mud base is water. However, should the drilling mud base be oil, a further step in the method of the present invention comprises flushing the last portion of the oil base ever-decreasing weight drilling mud from the wellbore through the introduction of a water base drilling mud having substantially the same density as the cement to be utilized.

Within the method of the present invention, the particulate material utilized may have a density less than that of the drilling mud base wherein the method comprises recirculating the produced drilling mud into the wellbore together with additional particulate material added to the produced drilling mud to decrease the density thereof. It is also an embodiment of the present invention that should the particulate material utilized have a density greater than that of the drilling mud base. In this case the produced drilling mud is recirculated into the wellbore together with additional drilling mud base added to the produced drilling mud to decrease the density.

BRIEF DESCRIPTION OF THE DRAWING

The present invention may be more fully understood by referral to the accompanying FIGURE in which is shown a drilled wellbore containing high density drilling mud into which an ever-decreasing weight drilling mud is introduced for the displacement of the high density drilling mud for subsequent cementing of a casing string within the wellbore.

DETAILED DESCRIPTION OF THE INVENTION

The present invention utilizes a sequential injection of an ever-decreasing weight drilling mud into wells for the total displacement of a high density drilling mud from the wellbore. Therefore, by continually decreasing the weight of the drilling mud introduced, an even displacement of high density drilling mud from the well is accomplished so that a drilling mud, having substantially the same density as the cement to be utilized for the cementing of a casing string to the well-bore wall, is present in the wellbore for the cementing operation. Through use of the method of the present invention, cement is easily introduced into the wellbore and evenly displaces the drilling mud present in the well so that adequate contacting of the casing, cement and the wellbore wall is achieved. By the present method, no residual high density drilling mud is retained within the cementing operation, thereby precluding the necessity of a continued recirculation of a low density drilling mud within the wellbore to remove the high density drilling mud previously contained therein.

Generally, for the cementing of the casing to the wellbore and the displacement of a high density drilling mud contained within a well, the displacement mud should be of approximately the same consistency and have the same base as that of the high density drilling mud utilized in the drilling operation. Therefore, in the use of a water base drilling mud, having a high particulate content for high density achievement, the displacement drilling mud should also be a water base drilling mud having an ever-decreasing density, so that a uniform displacement of the high density drilling mud from the wellbore is achieved. It is preferred that when the cement is introduced into the well, it contact a water base drilling fluid. Therefore, should an oil base drilling fluid be utilized in the drilling operation, an ever-decreasing concentration of oil base mud, having a sequentially lowered density, should be utilized first to clear the high density oil base mud from the well. The sequential introduction is followed by circulation of a water base drilling mud having the same or substantially the same density as the water base cement to be utilized. Therefore, no water-oil interface is formed through the introduction of a water base cement and adequate cement completions may be accomplished.

Within the utilization of the present invention, the density of the ever-decreasing weight drilling mud may be varied by altering the particulate content of the ever-decreasing weight drilling mud introduced into the wellbore. This particulate content may be manipulated, for example by the use of a particulate material having a density less than that of the drilling mud base through the introduction of further particulate material into the drilling mud as it is introduced into the wellbore, or, in the case of particulate material having a density greater than that of the drilling mud base, by the further introduction of drilling mud base into the drilling mud as it is introduced into the formation. Should a particularly high density particulate material be utilized for the attainment of a high density drilling mud having coarse particulate matter contained therein, it may be necessary to add particulate material having a lower density than the particulate material utilized within the original high density drilling mud to obtain the ever-decreasing density drilling mud for displacement purposes since an over-introduction of drilling mud base may hamper the wellbore completion by washing the wellbore and forming large cavities therein which are particularly difficult for casing completion purposes. Therefore, it is within the comprehension of the present invention that multiple forms of particulate material may be introduced within the drilling mud to obtain the ever-decreasing drilling mud materials disclosed in the method.

The principles of the present invention may be more fully understood by referral to the accompanying Figure. In the Figure, a wellbore 12 is completed from the earth's surface 11 through overburden rock 25, into a subterranean reservoir 24. The wellbore has a casing string 14 contained therein which is to be cemented to the wellbore 12. For the completion of the casing string 14, it is first necessary to remove a high density drilling mud 13 contained in the wellbore. Apparatus utilized to conduct the method of the present invention comprises an annulus outlet 15 connected to the wellbore at the surface and fed a drilling mud 17 through a valve assembly 16. This apparatus is utilized to continually reduce the density of the drilling mud and mud weight by use of a mud pump 18 connected to an inlet 19 directly aligned with the casing string 14.

In the operation of the method of the present invention, the high density drilling mud 13 is displaced from the wellbore 12 through the annulus formed between the casing string 14 and wellbore 12 by introduction of an ever-decreasing weight drilling mud within the casing string 14. The ever-decreasing weight drilling mud is represented in the Figure by drilling mud slug 23 having a density slightly lower than that of the high density drilling mud 13 and is followed by ever-decreasing weight drilling mud slugs 22, 21 and 20. The sequentially decreasing densities of the drilling mud eventually reach a density similar to that of the cement to be utilized in the completion of the casing string 14 within the wellbore 12 so that the cement may easily be introduced within the system. This introduction allows the displacement of a drilling mud having essentially the same density and base as the cement, for example water, for its removal from the wellbore and for the cementing of the casing string 14 to the wellbore 12. As mentioned, when the drilling mud base is oil, the method further comprises flushing the last portion of the oil base ever-decreasing weight drilling mud from the wellbore through the introduction of a water base drilling mud having substantially the same density as the cement to be utilized with subsequent introduction of the cement into the wellbore for the completion of the casing string.

Although the introduction of ever-decreasing weight drilling mud in the accompanying Figure is depicted as slugs being introduced within the well, it is readily understood that the slugs are depicted only for the purposes of illustration. The sequential introduction of a drilling mud into the wellbore would normally be a continual decreasing of the density of the mud during the flushing operation. Although the slug method may be utilized when apparatus necessary for appropriate mixing and recirculation of drilling mud is not available, conventional operations are provided with a complement of mud pits and mud pumps, so that the recirculation operation may be easily accomplished for the displacement of the high density drilling muds therefrom the wellbore.

The present invention then provides a method to circumvent the conventional procedures utilized for the cementing of wellbores exhibiting the presence of a high density drilling mud and eliminates the tedious operation of circulating cement therein the wellbore to insure clean wellbores are associated with the cement. The method insures that pockets of high density drilling mud do not remain within the casing completion so that detrimental cementing of casing does not occur and adequate contacting of the casing, cement and wellbore is achieved. Therefore, through utilization of the present method for removing high density drilling muds from drilled wellbores, the cementing of casing strings therein may be accomplished with an adequate contacting of the casing, cement and wellbore walls being provided through a simplified method utilizing conventional drilling mud and cementing apparatus.

The invention has been described herein with respect to particular embodiments and aspects thereof. It will be appreciated, however, by those skilled in the art that various changes and modifications may be made without departing from the scope of the invention as set forth herein.

Therefore, I claim:

1. A method of removing a high density drilling mud from a wellbore for the subsequent cementing of casing, which comprises injecting an ever-decreasing weight drilling mud into the wellbore with the first portion of the ever-decreasing weight drilling mud having a density substantially that of the high density drilling mud contained within the wellbore and with the last portion thereof having a density similar to that of the cement to be utilized for the casing completion.

2. The method of claim 1 wherein the density of the ever-decreasing weight drilling mud is varied by altering the particulate content of the ever-decreasing weight drilling mud introduced into the wellbore.

3. The method of claim 2 wherein the high density drilling mud and the ever-decreasing weight drilling mud have the same drilling mud base.

4. The method of claim 3 wherein the drilling mud base is water.

5. The method of claim 3 wherein the drilling mud base is oil, and further comprising flushing the last portion of the oil base ever-decreasing weight drilling mud from the wellbore through the introduction of a water base drilling mud having substantially the same density as the cement to be utilized.

6. The method of claim 2 wherein the particulate material utilized has a density less than that of the drilling mud base and further comprising recirculating the produced drilling mud into the wellbore along with added particulate material.

7. The method of claim 2 wherein the particulate material utilized has a density greater than that of the drilling mud base and further comprising recirculating the produced drilling mud into the wellbore by adding drilling mud base thereto the produced drilling mud.

* * * * *